US006273410B1

(12) United States Patent
Kohlert

(10) Patent No.: US 6,273,410 B1
(45) Date of Patent: Aug. 14, 2001

(54) SUPPORT ELEMENT FOR HOLDING A WORK PIECE

(76) Inventor: Rudolf Kohlert, Danziger Str. 3, D 63811 Stockstadt (DE)

(*) Notice: Subject to any disclaimer, the term of this patent is extended or adjusted under 35 U.S.C. 154(b) by 0 days.

(21) Appl. No.: 09/547,774

(22) Filed: Apr. 12, 2000

(30) Foreign Application Priority Data

Apr. 12, 1999 (DE) .............................................. 199 16 260

(51) Int. Cl.[7] .............................................. B23Q 3/00
(52) U.S. Cl. .............................................. 269/309
(58) Field of Search .............................. 269/309, 310, 269/20, 296; 186/67, 129; 91/422, 443

(56) References Cited

U.S. PATENT DOCUMENTS 5,915,679 6/1999 Kohlert .

*Primary Examiner*—Robert C. Watson
(74) *Attorney, Agent, or Firm*—W. F. Fasse; W. G. Fasse

(57) ABSTRACT

A workpiece support element has a support bolt (2) slideable in a housing bore. A biasing spring (26) moves the bolt into a work piece contacting position. A locking piston (4) is provided with a recess (22) which separates two segments (28) having concavely beveled edges or piston pressure webs or members (17, 18) for locking the support bolt (2) in the housing. The housing bore is provided with a recess (21) to form concavely beveled edges or housing pressure webs or members (19, 20) for contacting the cylindrical surface of the support bolt (2). In the working position the support bolt (2) is locked between the pressure webs (17, 18, 19 and 20) which increase the locking pressure since these surfaces are smaller than the surface area of the piston (4) exposed to the locking pressure. The piston (4) is provided with an elastically deformable bottom so that the piston segments (28) can move slightly outwardly against the wall of the cylinder wall in which the locking piston (4) is held in place.

12 Claims, 2 Drawing Sheets

SUPPORT ELEMENT FOR HOLDING A WORK PIECE

CROSS-REFERENCE TO RELATED CASE

The present application is related to U.S. Pat. No. 5,915,679, (Kohlert) issued on Jun. 29, 1999, Title: SUPPORT ELEMENT FOR SECURING A workpiece ON A SUPPORTING SURFACE.

PRIORITY CLAIM

This application is based on and claims the priority under 35 U.S.C. §119 of German Patent Application 199 16 260.3, filed on Apr. 12, 1999, the entire disclosure of which is incorporated herein by reference.

FIELD OF THE INVENTION

The invention relates to a support element for holding or supporting a workpiece in a machine tool, on a platform or the like. Such elements include a support bolt slideably mounted in a housing for supporting an unstable work piece.

BACKGROUND INFORMATION

U.S. Pat. No. 5,915,679 (KOHLERT) describes a workpiece holding element with a support bolt slideably movable and guided in a bore of a housing. Once the support bolt has reached its clamping or rather support position in response to an air stream, a locking piston is pressed, for example by a hydraulic force, against the support bolt in a direction perpendicularly to the longitudinal bolt axis to hold the support bolt in place.

When clamping unstable work pieces on a machine tool or on pallets, it is necessary to perform the clamping in such a way that the work pieces are not deformed and that a located workpiece is not displaced out of its precise, located position. Thus, excessive forces may not be applied to the work pieces. However, it is nevertheless necessary that the work pieces are in a stable position for the machining operation. Especially for unstable work pieces a repeatable, fine adjustment of the force applied to the workpiece to keep it in place is required and such requirement can be satisfied only by special support elements. Normally, more than three support points are required. The support elements must be so constructed that the support bolt can easily be positioned to contact the workpiece and then to lock the support bolt in the workpiece contacting position without deforming the and without displacing the workpiece.

Other conventional workpiece holding elements are equipped with screws, springs or wedges for adjusting and holding the support bolt. These elements are mechanically operated, whereby so-called stretch belts may be used. However, hydraulically operated support elements are also known. Generally, the locking takes place either by maintaining the pressure that moves the support bolt or by a laterally extending force applied to the support bolt. In the above mentioned U.S. Patent to Kohlert the support bolt is mounted in a housing and pneumatically movable into a workpiece contact by air that is introduced into the housing bore that guides the support bolt. The air that moves the support bolt is passing through special guide channels and develops a determinable or controllable contact force between the support bolt and the work piece. The locking of the support bolt is accomplished by a hydraulically operated locking piston extending perpendicularly to the length of the support bolt and pressing the support bolt against the wall of the housing bore.

The hydraulic forces effective through the locking piston on the support bolt during a machining operation assure an absolutely safe holding or locking of the support bolt. This feature means that the frictional forces which are effective on the support bolt by the pressure exerted by the piston must be larger than the reaction forces from the workpiece.

The supporting element of my earlier invention performs its function well. However, there is room for improvement, especially with regard to simplifying the construction and avoiding the need for both a hydraulic source of pressure and a pneumatic source of pressure.

OBJECTS OF THE INVENTION

In view of the above it is the aim of the invention to achieve the following objects singly or in combination:

- to construct a workpiece support element that is capable of placing a support bolt into contact with the workpiece without a pneumatic source of pressure;
- to assure that contacting the workpiece by the support bolt will not disturb in any manner the work piece;
- to make sure that the sum of all frictional pressure forces caused by the locking force applied to the support bolt by the locking piston is larger at all times than the pressure force applied to the locking piston;
- to lock the locking piston in the cocked state in such a way in the housing that the locking piston becomes in effect a fixed element of the housing so that it will maintain the locking pressure without any elastic reaction by the locking piston and/or the support bolt so that a precise maintenance of the workpiece position is assured at all times.

SUMMARY OF THE INVENTION

A supporting element according to the invention is characterized by the combination of the following features. A support bolt or pin is movably guided in a housing and maintained in a workpiece supporting position by a locking piston which is movable in a direction at right angles relative to the support direction. The support bolt or pin is guided in a preferably dead-end bore of the housing. The bore such as a dead-end bore is provided with a recess in the housing wall extending along the dead-end bore over the range of movement of the support bolt. The recess has a circumferential width that is smaller than the diameter of the support bolt. The recess has edges that are preferably provided with a concave bevel or chamfer to form two housing pressure surfaces or housing pressure take-up members in contact with the support bolt. The locking piston is provided with a second recess also having a diameter smaller than the diameter of the support bolt so that two locking piston segments are formed having inwardly directed edges extending lengthwise of the support bolt in the motion direction of the support bolt when it is brought into a working position or removed out of a working position. The inwardly directed edges of the piston segments are also preferably concave to form two piston pressure surfaces or piston pressure take-up members for contacting the support bolt. Thus, in the locking position of the locking piston, the support bolt is clamped between the housing pressure take-up members and the piston pressure take-up members. These pressure take-up members provide relatively small contact areas between the support bolt and the housing and between the support bolt and the locking piston. These small surface areas of the pressure takeup members assure a substantially larger pressure force application to the support bolt than is possible when the locking force is distributed over the full cylindrical surface of the support bolt. This feature of the invention takes advantage of the fact that the pressure, expressed as force per surface area, becomes larger when the surface area becomes smaller.

It is an advantage of the invention that in the clamping state due to the reaction forces, a moment is applied to the locking segments of the locking piston. This moment bends the locking segments radially outwardly until the support projections of the locking segments solidly contact the cylinder wall in the housing for arresting the locking piston in the cylinder of the housing.

BRIEF DESCRIPTION OF THE DRAWINGS

In order that the invention may be clearly understood, it will now be described in connection with example embodiments, with reference to the accompanying drawings, wherein.

Figure 2:
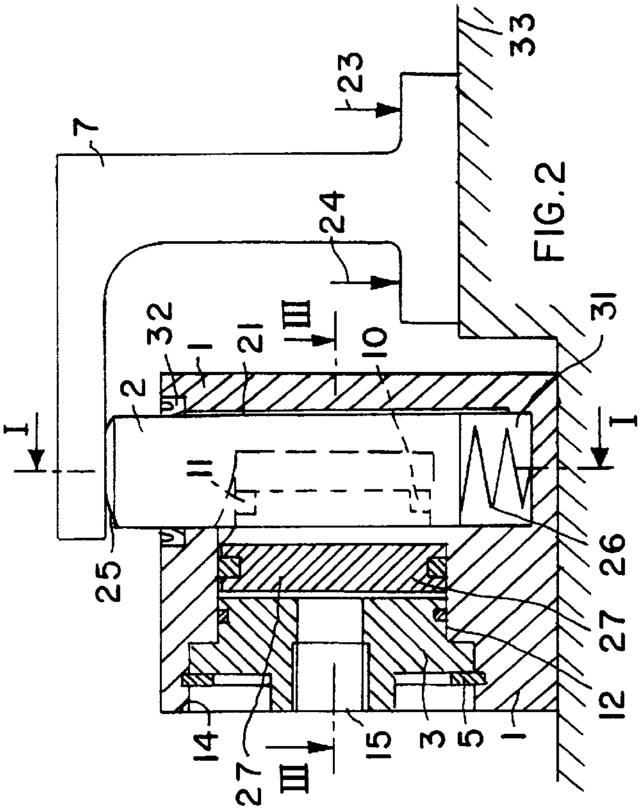
FIG. 2 is a side view, partially in section along section line II—II in FIG. 1.

DETAILED DESCRIPTION OF PREFERRED EXAMPLE EMBODIMENTS AND OF THE BEST MODE OF THE INVENTION

Referring to FIGS. 1, 2, 3 and 4 in conjunction, the present support element comprises a housing 1, a support bolt 2 slideably guided in the housing 1 and a locking piston 4 operatively mounted in the housing 1 so that the piston central axis extends perpendicularly to the length axis of the support bolt 2. A spring 26 urges the support bolt 2 upwardly against a workpiece 7 that is mounted by screws 23, 24 to a surface 33, for example forming a machine tool support. The force of the spring 26 is so selected that the support bolt 2 will not deform the workpiece 7. The force of the spring 26 is just sufficient to cause the support bolt 2 to contact the work piece. The spring 26 is correspondingly relaxed. The contact between the support bolt 2 and the workpiece 7 can be accomplished either by moving the workpiece against the support element or by moving the support element into the proper position for the support bolt 2 to contact the workpiece 7. For this purpose the support bolt 2 can be pressed into the housing 1 sufficiently for moving the housing 1 into the supporting position shown in FIG. 2. For this purpose the support bolt 2 has a crowned surface 25 for facilitating the contacting of the workpiece by the outwardly extending end of the support bolt 2.

As soon as the support bolt 2 contacts the workpiece, the bolt 2 is locked in position by the locking piston 4 as will be described below.

Figure 3:
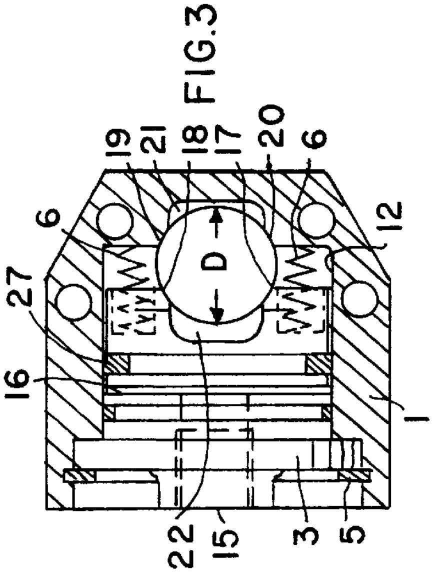
FIG. 3 is a horizontal section along section line III—III in FIG. 2 through the housing and the locking piston.
Figure 1:
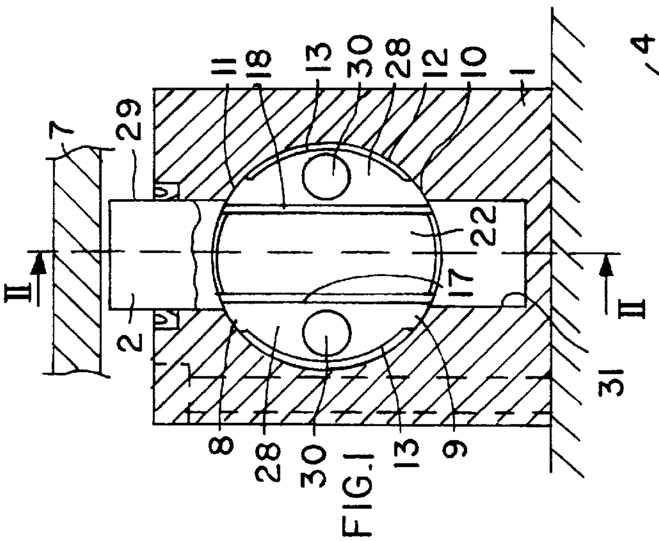
FIG. 1 is a sectional view through a support element of the invention along section line I—I in FIG. 2, showing a housing, a support bolt or pin and a locking piston.
Figure 4:
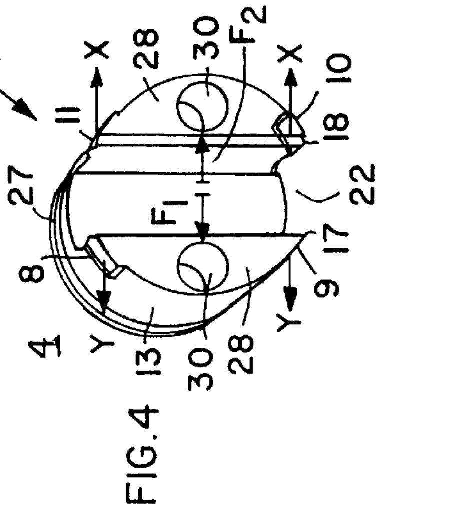
FIG. 4 is a perspective view of the locking piston to illustrate two piston segments.

Locking the support bolt 2 into a workpiece supporting position is accomplished by the locking piston 4 which is slideably movable in the housing in a direction at right angles to the longitudinal axis of the support bolt 2. For this purpose the locking piston 4 is provided with a recess or cut-out 22 in one end of the piston facing the support bolt 2. This cut-out 22 has a width that is smaller than the diameter of the support bolt 2, whereby two segments 28 are formed for contacting the support bolt 2. The segments 28 axially extend from the piston bottom 27. Each of the inwardly facing edges of the segments 28 is provided with a concave bevel thereby forming piston pressure application surfaces or piston pressure take-up members 17 and 18 that contact the support bolt 2. As best seen in FIG. 4, the piston segments 28 extend from a piston bottom 27 and face each other across the cut-out 22. The concave bevels of the piston webs 17, 18 have a curvature matching the cylindrical surface of the support bolt 2. The piston 4 is formed by the bottom 27 and the segments 28 and slides in a cylinder 12 formed as a bore in the housing 1. As shown in FIG. 3, a left-hand space 16 in the cylinder 12 between the piston bottom 27 and a cylinder closure 3 is connected to a source of hydraulic pressure through a hydraulic connector 15 passing through the closure 3. The connector 15 may include a quick coupler or the like.

The piston bottom 27 is made of a material which in itself is elastically deformable. The elastic bending of the segments 28 takes place in response to an application of a pressure that builds up in the space 16 in response to the reaction pressure when the locking piston 4 is bearing against the support bolt 2. The locking piston 4 is provided with four support projections 8, 9, 10 and 11 which are formed in the area of the segments 28 by partially removing a portion of the outer jacket 13 of the piston 4 to form an indentation in the piston jacket 13. These support projections 8, 9, 10 and 11 face radially outwardly for contacting the inwardly facing wall of the cylinder 12 as best seen in FIGS. 2 and 4. Further, one dead-end bore or hole 30 is formed in each segment 28. Return springs 6 are inserted into the bores 30 for returning the locking piston 4 into a rest position out of contact with the support bolt 2 when the pressure through the inlet formed by the connector 15 is released. The return springs 6 bear against the bottom of the cylinder 12 in the housing 1 on the one hand, and against the piston 4 on the other hand as best seen in FIG. 3. The cylinder bottom closure 3 is received in the open end of the cylinder 12 which has a smaller diameter inner end and a larger diameter outer bore 14 in the housing 1 thereby forming a shoulder against which a flange of the closure 3 rests. A locking ring such as a spring ring 5 received in a respective groove in the larger diameter bore 14 of the housing 1 retains the closure 3 in its position with the closure flange resting against the shoulder between the diameter of the cylinder 12 and the larger diameter of the bore 14.

The support bolt 2 is guided for easy sliding in the housing 1 in a bore 31 the bottom of which holds the above mentioned spring 26, which urges the support bolt 2 upwardly as seen in FIG. 2. The wall of the dead-end bore 31 in the housing 1 is provided along the entire stroke length of the bolt 2, which is slideably guided in the bore 31, with a recess 21 having a circumferential width smaller than the diameter of the support bolt 2. Due to the recess 21, two edges 19, 20 are formed with a concave bevel contacting the bolt 2. These bevels of the edges 19, 20 form pressure application contact surfaces or pressure take-up members 19, 20 between the housing 1 and the support bolt 2. An elastic sealing ring 32, through which the bolt 2 extends, seals the bore 31 in the housing 1 around the bolt 2.

The present support element with its housing 1 and bolt 2 is moved into a workpiece supporting position between the surface 33 such as a pallet or machine bed and the downwardly facing surface of the workpiece 7. Additionally, the workpiece 7 is secured by the above mentioned conventional workpiece clamping members such as screws 23 and 24 for securing the workpiece to the surface 33. During the movement into position, the bolt 2 is pressed inwardly against the spring 26 and released once the housing 1 is in the proper position. The spring assures a contact between the workpiece 7 and the crowned surface 25 of the bolt 2 without deforming or displacing the workpiece 7.

Once the support element is in the proper supporting position, the hydraulic connector 15 is connected through a pressure hose or the like to a source of hydraulic pressure introduced into the cylinder space 16 and this pressure drives the locking piston 4 against the support bolt 2. The piston 4 moves to the right toward the bolt 2 until the contact surfaces or pressure take-up members 17, 18 of the piston 4 bear against the bolt 2 and snugly contact the bolt cylinder surfaces, whereupon the bolt 2 is also pressed against the opposite housing contact surfaces or pressure take-up members 19, 20 until the bolt 2 is locked in position, whereby four force components are effective on the bolt in a direction normal to the longitudinal bolt axis as shown in FIG. 5.

Figure 5:
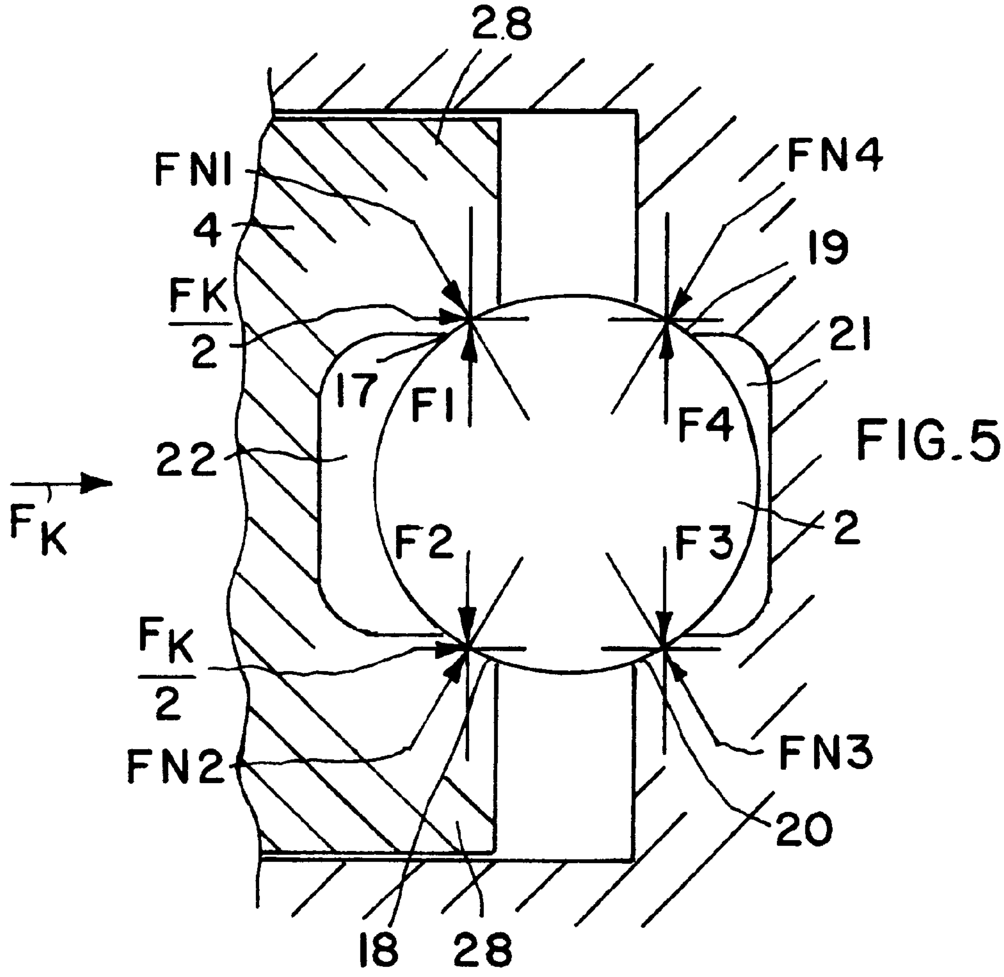
FIG. 5 is a sectional view similar to that of FIG. 3, however, on an enlarged scale to show the effective force components in the contact areas between the support bolt and the housing on the one hand and between the support bolt and the locking piston on the other hand.

These force components are designated FN1 to FN4 as shown in FIG. 5 illustrating a force component diagram. These four so-called normal forces, or rather pressures, are substantially larger than the pressure $F_K$ effective on the locking piston 4 because the surface areas between the pressure members 17, 18 of the piston 4 are substantially smaller than the surface area of the piston bottom 27 through which pressure is applied to the piston 4.

As soon as the locking piston 4 contacts the support bolt 2 to thereby press the support bolt 2 against the housing surface areas or pressure take-up members 19, 20, the respective reaction forces cause a bending moment that is effective on the segments 28 of the piston 4 and thus on the elastically deformable piston bottom 27, whereby the piston bottom 27 begins to slightly deform to permit spreading the segments 28 slightly radially outwardly just sufficient to assure locking contact of the contact projections 8, 9, 10 and 11 on the segments 28 to press against the inner wall of the cylinder 12, whereby the locking piston 4 with its segments 28 and contact projections 8, 9, 10 and 11 is locked inside the cylinder 12. Thus, the holding piston 4 becomes in effect a rigid component of the housing 1 in which the piston 4 is rigidly locked in position between the cylinder wall of the cylinder 12 and the projections 8, 9, 10 and 11 there is no play as shown in FIG. 4. Arrows F1 and F2 shown in FIG. 4 are the reaction forces effective on the piston segments 28 in the directions X and Y respectively. These reaction forces press or bend the segments 28 radially outwardly until the segments 28 bear with the projections 8, 9, 10, 11 against the wall of the cylinder 12. The support bolt 2 is thus locked in the housing in such a way that the pressure forces effective on the pressure take-up members 17, 18, 19 and 20 are larger in their sum than the reaction forces that occur during the machining of the workpiece 7, whereby the bolt 2 is fully effective against these reaction forces or loads.

For releasing the bolt 2 from its support position, the hydraulic pressure is removed through the connector 15, whereby the piston 4 is relaxed and the segments 28, due to the slight elasticity of the piston bottom 27, are capable of sliding away from the bolt 2. The return springs 6 now move the piston 4 back into the starting position and the bolt 2 is freely movable or slideable in the housing 1 against the force of the spring 26. The springs 6 and 26 may be replaced by elastomeric members having the same effect.

The pressure take-up members 17, 18, 19, 20 have preferably bolt contacting surface areas that are as small as possible and may even be formed as line edges that contact the support bolt 2. However, contact surfaces with a concave bevel are preferred, whereby the concave surface should have a radius corresponding to one half of the diameter D of the support piston 2.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A support element for supporting an unstable workpiece on a surface, said support element comprising a housing (1), a bore (31) in said housing, a support bolt (2) having a bolt diameter slidably guided in said bore (31), a cylinder (12) in said housing, a locking piston (4) movable in said cylinder, said bore having a central longitudinal bore axis defining a movement direction for said support bolt (2), said cylinder having a central cylinder axis extending at a right angle to said bore axis, said housing (1) comprising a first recess (21) extending along said bore, said first recess having a dimension in the circumferential direction smaller than said bolt diameter, said housing having along said first recess housing edges for contacting said support bolt, said housing edges forming housing pressure take-up members (19, 20) contacting said support bolt opposite said locking piston (4), said locking piston (4) comprising two piston segments (28) and between said piston segments (28) a second recess (22), forming between said two piston segments (28) a spacing smaller in width than said bolt diameter, said piston segments (28) having next to said second recess piston edges for contacting said support bolt, said piston edges extending in parallel to said bore axis and forming piston pressure take-up members (17, 18) for contacting said support bolt in response to pressure applied to said locking piston (4).

2. The support element of claim 1, wherein each of said housing pressure take-up members (19, 20) and each of said piston pressure take-up members (17, 18) has a concave bevel surface for contacting said support bolt.

3. The support element of claim 2, wherein said concave bevel surface has a curvature with a radius corresponding to one half of said diameter of said support bolt.

4. The support element of claim 1, wherein said bore (31) is a dead-end bore having a closed bottom providing a space in said bore between said closed bottom and said support bolt (2).

5. The support element of claim 4, further comprising an elastic member (26) in said space for urging said support bolt (2) with an outer bolt end against a work piece.

6. The support element of claim 5, wherein said elastic member is a spring (26).

7. The support element of claim 1, wherein said locking piston (4) further comprises a piston bottom (27) made of an elastically deformable material, and wherein said two piston segments (28) extend from said piston bottom with said second recess (22) positioned between said two piston segments.

8. The support element of claim 1, wherein each of said piston segments (28) comprises a dead end hole (30), said support element further comprising a piston reset spring (6) inserted in each of said dead end holes (30) for returning said locking piston (4) into a rest position when a working pressure is removed from said locking piston.

9. The support element of claim 1, wherein each of said piston segments (28) comprises a radially outwardly facing jacket (13) provided with an indentation forming on said piston segments a plurality of radially outwardly facing projections (8, 9, 10, 11) contacting a radially inwardly facing wall of said cylinder (12) for arresting said locking piston (4) in said cylinder (12) in a working position in which said locking piston holds said support bolt (2) against displacement.

10. The support element of claim 9, wherein said locking piston (4) comprises at least one portion made of elastically yielding material for permitting said piston segments (28) to move radially outwardly in response to a working pressure applied to said locking piston, whereby said projections (8, 9, 10, 11) bear against said inwardly facing wall of said cylinder (12) for said arresting of said locking piston (4) in said housing (1).

11. The support element of claim 10, wherein said at least one portion of said locking piston of elastic material forms a piston bottom, said piston segments extending from said piston bottom.

12. The support element of claim 1, wherein said piston pressure take-up members (17, 18) and said housing pressure take-up members (19, 20) in contact with said support bolt (2) have a total surface area that is smaller than a pressure application surface of said locking piston (4) so that the sum of pressure forces applied to said support bolt is correspondingly larger than a pressure force applied to said pressure application surface of said locking piston.

* * * * *